(12) United States Patent
Udd

(10) Patent No.: US 8,903,939 B2
(45) Date of Patent: Dec. 2, 2014

(54) COMMUNICATION CONTROL

(75) Inventor: Sture Udd, Vaasa (FI)

(73) Assignee: UPC Konsultointi Oy, Vaasa (FI)

(*) Notice: Subject to any disclaimer, the term of this patent is extended or adjusted under 35 U.S.C. 154(b) by 897 days.

(21) Appl. No.: 12/514,722

(22) PCT Filed: Nov. 14, 2006

(86) PCT No.: PCT/FI2006/050496
§ 371 (c)(1),
(2), (4) Date: May 13, 2009

(87) PCT Pub. No.: WO2008/059099
PCT Pub. Date: May 22, 2008

(65) Prior Publication Data
US 2010/0088393 A1    Apr. 8, 2010

(51) Int. Cl.
*G06F 15/16* (2006.01)
*G06F 15/173* (2006.01)
*H04W 8/08* (2009.01)
*H04L 29/12* (2006.01)
*H04W 88/04* (2009.01)
*H04L 29/06* (2006.01)

(52) U.S. Cl.
CPC .......... *H04W 8/082* (2013.01); *H04L 29/12462* (2013.01); *H04L 61/255* (2013.01); *H04W 88/04* (2013.01); *H04L 65/1069* (2013.01)
USPC ............................ 709/217; 709/203; 709/223

(58) Field of Classification Search
USPC ................. 709/203, 217–219, 223, 227–229
See application file for complete search history.

(56) References Cited

U.S. PATENT DOCUMENTS

| | | | | |
|---|---|---|---|---|
| 5,822,543 A | * | 10/1998 | Dunn et al. | 709/224 |
| 5,867,494 A | * | 2/1999 | Krishnaswamy et al. | 370/352 |
| 5,938,727 A | | 8/1999 | Ikeda | |
| 5,971,277 A | | 10/1999 | Cragun et al. | |
| 6,430,554 B1 | * | 8/2002 | Rothschild | 1/1 |
| 7,023,837 B1 | * | 4/2006 | Srinivasan | 370/352 |
| 7,472,192 B2 | * | 12/2008 | DeFerranti et al. | 709/226 |
| 7,810,089 B2 | * | 10/2010 | Sundarrajan et al. | 717/174 |
| 2003/0163520 A1 | * | 8/2003 | Bussani et al. | 709/203 |
| 2008/0194251 A1 | * | 8/2008 | Tischer et al. | 455/426.1 |

FOREIGN PATENT DOCUMENTS

| | | |
|---|---|---|
| WO | WO-00/60484 A1 | 10/2000 |
| WO | WO-01/75629 A1 | 10/2001 |
| WO | WO-01/86501 A1 | 11/2001 |

* cited by examiner

*Primary Examiner* — Minh-Chau Nguyen
(74) *Attorney, Agent, or Firm* — Birch, Stewart, Kolasch & Birch, LLP

(57) ABSTRACT

A method of controlling a connection, comprising the steps of forming an indicator at an originating device, transmitting the indicator to an intermediate device, receiving from the intermediate device one or more destination addresses formed on the basis of the indicator, and connecting the originating device to the one or more destination addresses.

14 Claims, 2 Drawing Sheets

COMMUNICATION CONTROL

FIELD

The present invention relates to communication control in a communication network.

BACKGROUND

In a communication network, a connection is set up between two parties. If the destination party has changed its fixed location in the network, the original destination party becomes an intermediate party, which redirects the connection to a new destination party. The intermediate party remains in the connection chain and data is transferred via the intermediate party.

In some cases it is undesirable that the intermediate party remains in the connection chain because this allows the intermediate party to control the traffic transmitted between the connected parties.

SUMMARY

In one aspect, there is provided a method of controlling a connection, comprising reading an indicator in an originating device, transmitting the indicator to an intermediate device, receiving from the intermediate device one or more destination addresses formed on the basis of the indicator, and connecting the originating device to the one or more destination addresses.

In another aspect, there is provided a user device comprising a reading module configured to read an indicator, a transmitting unit configured to transmit the indicator to an intermediate device, a receiving unit configured to receive from the intermediate device one or more destination addresses formed on the basis of the indicator, and a connecting unit configured to connect the user device to the one or more destination addresses.

In another aspect, there is provided a network element comprising a receiving unit configured to receive an indicator from a user device, a processing unit configured to form one or more destination addresses on the basis of the indicator, and a transmitting unit configured to transmit the one or more destination addresses to the user device.

DRAWINGS

In the following the invention will be described in greater detail by means of preferred embodiments with reference to the attached drawings, in which FIG. 1 shows an embodiment of a communication network;

EMBODIMENTS

Figure 1:
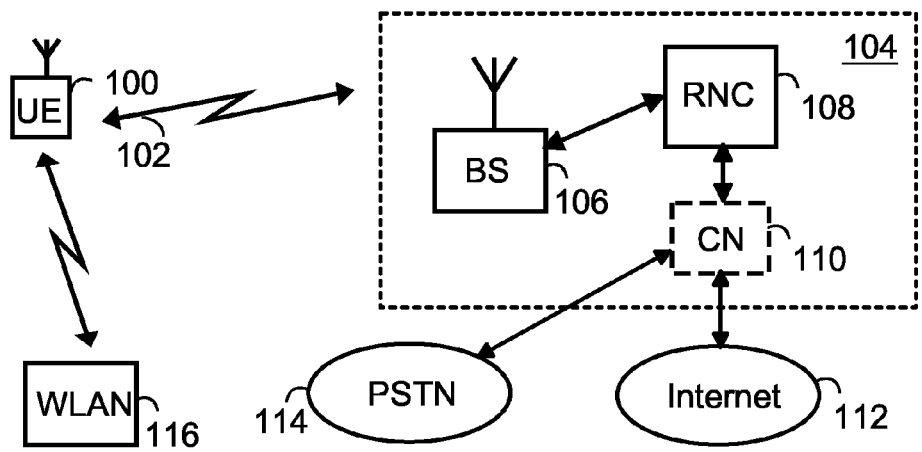

FIG. 1 shows on a high level an operation environment of a mobile station and the way the mobile station establishes a connection with networks. The embodiments are not limited to any specific communication system although FIG. 1 shows a UMTS (Universal Mobile Telecommunications System) radio system as an example. As examples of other applicable communication systems, the following may be mentioned: Global System for Mobile Communications (GSM), Wireless Local Area Network (WLAN), Worldwide Interoperability for Microwave Access (WiMAX), Bluetooth, Personal Communications Services (PCS), and systems using ultra-wideband (UWB) technology.

FIG. 1 is a simplified illustration of a communication system to which embodiments according to the invention are applicable. FIG. 1 shows a part of a UMTS radio access network UTRAN, which is a radio access network employing wideband code division multiple access (WCDMA) technology.

In FIG. 1, a user device 100 has a bi-directional radio link 102 with a base station 106 of an UMTS network 104. The user device may be a fixed station, or a portable station, such as a mobile phone or a portable computer having radio communication equipment. The user device may be equipped to operate in one or more radio communication systems, even simultaneously, in which case it is commonly referred to as a multiradio device. For example, the user device may be able to support not only UMTS, but also WLAN or Bluetooth. As an example of another radio system that the user device 100 supports, FIG. 1 illustrates a WLAN network 116.

The base station 106 includes transceivers for providing bi-directional radio links to user devices, which are within the operational area of the base station. The base station is further connected to a radio network controller (RNC) 108 that controls in a centralized manner several base stations connected to it. The radio network controller is further connected to a core network 110 (CN). The core network may include a mobile services switching centre (MSC), a media gateway (MGW), a GGSN (Gateway General packet radio service Support Node), a serving GPRS support node (SGSN), or a gateway mobile switching center (GMSC). The GMSC is responsible for delivering traffic between fixed telephony networks, such as PSTN (Public Services Telephony Network) and UMTS, and the GGSN is responsible for switching traffic between packet data networks, such as the Internet and the UMTS network.

Figure 2:
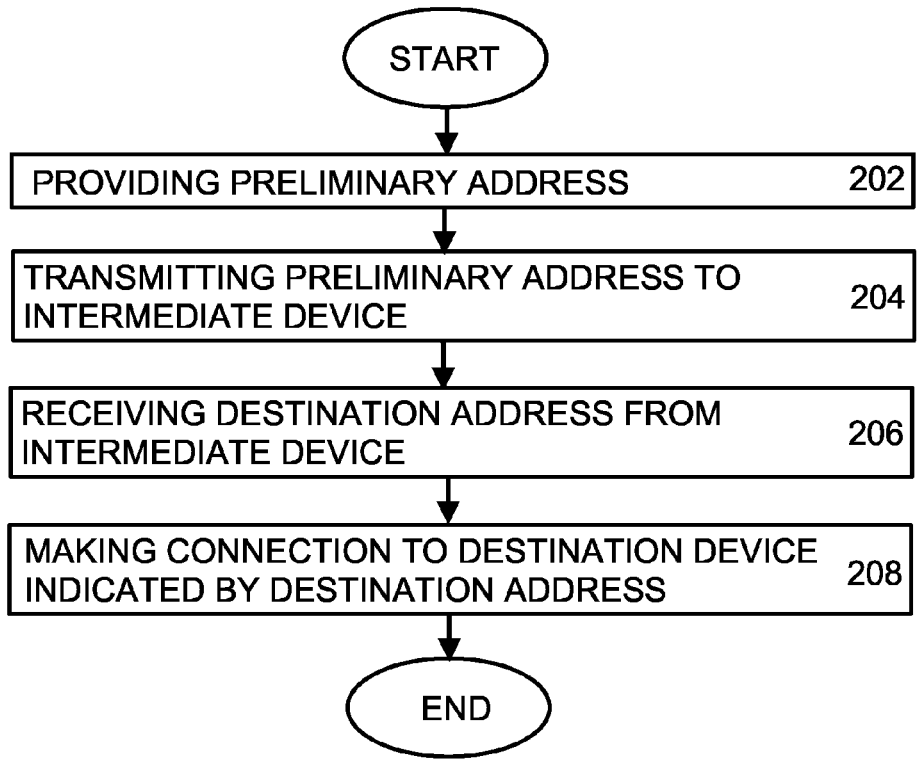
FIG. 2 shows an embodiment of a method.

FIG. 2 shows one embodiment of a method. In the embodiment, the method of FIG. 2 is seen from the perspective of a user device, such as a mobile phone. The method of FIG. 2 is suitable for use in a network structure that includes one or more of the following: a user device, one or more intermediate devices and one or more content servers. The user device may be a mobile phone or a portable computer, and the intermediate device and the content servers may be mobile phones or server computers in an Internet network, for instance. In the method, the goal of the user device is to make a connection with one or more contents servers.

In 202, the user device provides a preliminary address. The user device may obtain an indicator, such as a preliminary destination address, inputted/selected by the user of the user device or by reading a matrix code. Herein, the matrix code may mean a one-dimensional bar code or a two-dimensional data matrix bar code or some other 2D code, for instance. The readable object may also be something else than a data matrix code. The indicator may be obtained by reading any form of waveform information, such as by reading optical, sound, electromagnetic or magnetic transmission, for instance.

The code, such as a data matrix bar code, may indicate for the user device that the bar code includes a preliminary address, which has to be verified or updated in an intermediate device to make it a valid destination address. There may also be a plurality of intermediate servers provided, in which case the matrix code may include information which intermediate server the user device should contact depending on the time, location or language of the user device, for instance. For example, the matrix code may include information that the user device shall contact intermediate server IS-1 from 8 am to 4 pm, IS-2 from 4 pm to 12 pm and IS-3 at other times. Upon reading the matrix code, the user device may then check the time and branch its request to different intermediate servers depending on the time.

The user device may also branch its request on the basis of the language used in the user device. For instance, if the user of the user device has set French as the language used in the device, the intermediate device may primarily provide content servers that provide the service that the user wants in French. Or the intermediate server may provide one or more content servers, which are located in France, on the basis of the information that the user device has French as the language set up in the device. In these embodiments, the user device transmits the information of the language used in the device to the intermediate device.

The intermediate device may be identified by an IP address, for instance. The user device may obtain the IP address of the intermediate device by reading the matrix code. Additionally, the user device may obtain a preliminary address of a content server by reading the matrix code. In 204, the user device may then transmit the preliminary address of the content server to an intermediate device. The preliminary address may be in the form of an IP address or in text format indicating the name of the content server, for instance. Together with the preliminary address, the user device may provide the intermediate server with the time or location of the user device. The user device may determine its location by way of the GPS (Global Positioning System) or by a service provided by a mobile network, for instance.

Thus, in a simplest case, the user device obtains a preliminary address by reading a matrix code from a magazine, for instance, and transmits the preliminary address to an intermediate device indicated by the matrix code. In a more complex scenario, the matrix code (or some other information source) provides the user device with a hopping sequence. The hopping sequence may define a plurality of intermediate servers that the user device should contact in an order determined by the hopping sequence. For instance, the hopping sequence may instruct the user device how to hop between five servers such that the server is changed every minute.

When the method is seen from the perspective of the user device, in 206 the user device receives a destination address from the intermediate device. The destination address may be in the form of an IP address, for instance. In the simplest case, the user device receives the destination address once. In another embodiment, the user device receives a primary destination address and one or more alternative addresses. The one or more alternative addresses may be taken into use if the preliminary destination address is unavailable. In another case, the user device may use the primary destination address and one or more alternative destination addresses according to a hopping sequence provided by the intermediate device. For example, the intermediate device may provide the user device with the addresses of three content servers and a hopping sequence to change the active content server every second. This way, a very secure system for transmitting information is provided and tracking the traffic between the user device and the plurality of content servers becomes very difficult.

In 208, the data transmission between the user device and one or more content servers is activated. It should be noted that the content servers do not need to be in the same network. The user device may be capable of operating with a GSM, WLAN, Bluetooth and Internet network. Thus, the user device may receive as instruction from the intermediate server that information should be retrieved from three content servers, one in the Internet, one WLAN and one GSM/GPRS device. The device may be a multiradio device which may simultaneously have several radio connections active in different radio systems.

The data transfer between the user device and one or more contents server may be take place until the user device has completed its service need.

Figure 3:
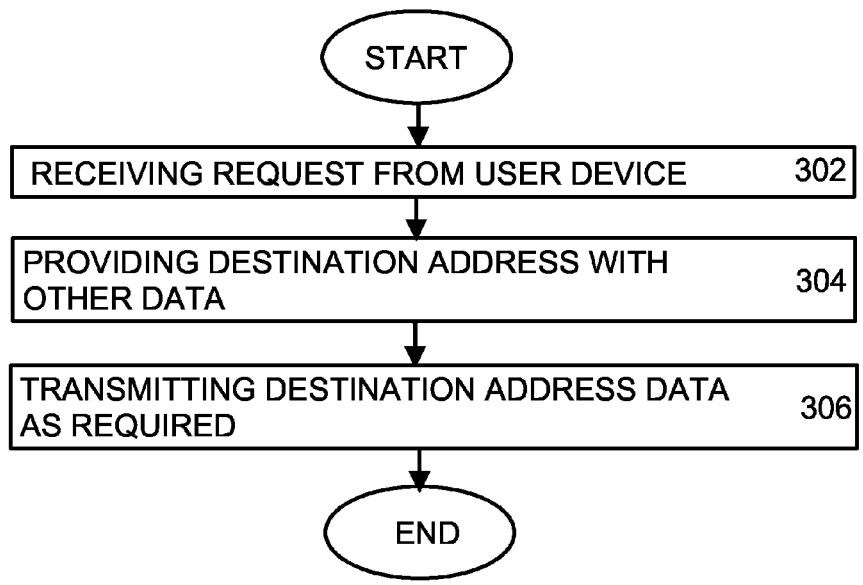
FIG. 3 shows another embodiment of a method.

FIG. 3 shows an embodiment of a method as seen from the perspective of an intermediate server.

In 302, the intermediate server receives a service request from a user device. The service request may include an indicator corresponding to a content server the user device wants to use. Additionally the request may include data, such as location of the user device or the time. The intermediate server may also check the time itself.

In 304, the intermediate server provides one or more destination addresses. For mapping a preliminary address received from the user device to a destination address, the intermediate server may use a look-up table or a database table, for instance. Changing a preliminary address to a destination address may thus correspond to the steps of locating the position of the preliminary address in the lookup table and reading the corresponding destination address in the table. The lookup table may also contain other information, such as a hopping sequence, which should be selected in the case of a certain preliminary address, which was received from the user device. The hopping sequence may include a plurality of content servers that the user device shall address and the time intervals of addressing the content servers.

In 306, the intermediate server provides the user device with the data that is needed to route the user device to one or more such addresses of the content servers that a service request may be completed at the user device. The information may also include one or more radio systems that need to be accessed by the user device. For instance, the instructions sent to the user device may include information that during the first minute the user device shall use a WLAN contents server for downloading data, and the next minute the user device shall continue downloading of data in a GPRS network.

In an embodiment, the intermediate server provides the user device with destination information only once when requested by the user device. In this embodiment, the connection between the user device and intermediate device may be disconnected after the user device has received the destination information it needs.

In another embodiment, the connection between the user device and the intermediate device may be maintained for a longer time. That is, the intermediate device may transmit destination information often during the time the user device needs to have a connection with one or more content servers. However, also in this embodiment, the user data bypasses the intermediate server, and the intermediate server has no control over the data that is transmitted between the user device and one or more content servers.

Figure 4:
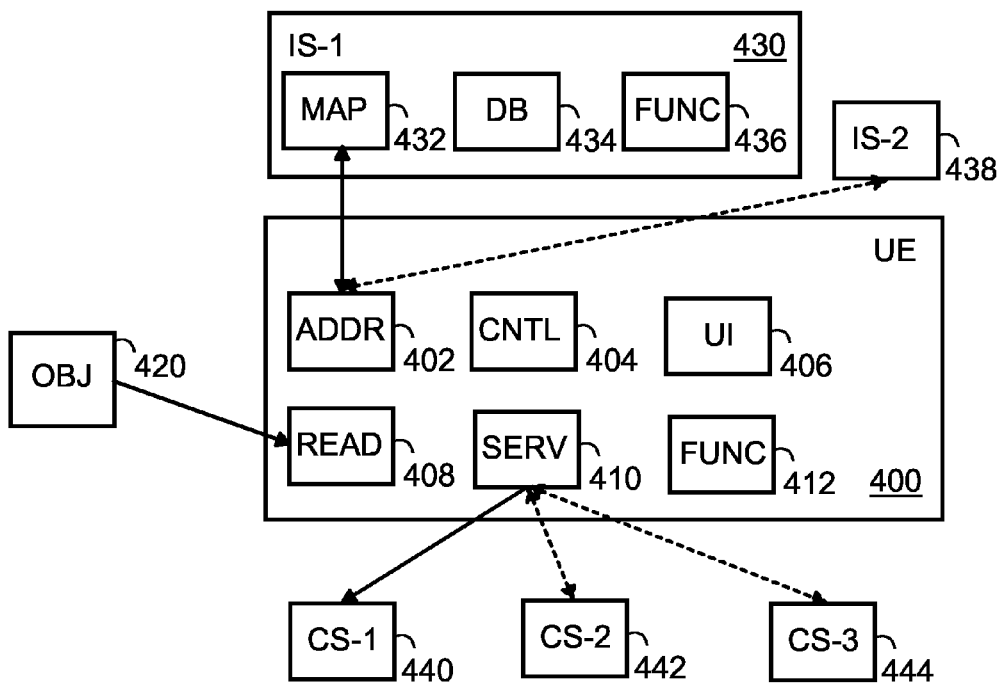
FIG. 4 shows another embodiment of a communication network.

FIG. 4 shows one embodiment of an arrangement and the relevant devices thereof. In the figure, three main entities have been illustrated, a user device 400, two intermediate devices 430 and 438, and three content servers 440, 442 and 444. FIG. 4 also shows a reading object 420, which may be a matrix code or some other information source, which specifies information contents of the interest to the user. The information contents may, for instance, offer the user of the device the possibility to browse the stock markets, download a piece of music, buy a ticket or pay a bill.

The following describes functionalities required by the different entities. FIG. 4 does not show, for the sake of clarity, all the interactions between the modules of the entities but it is understood that the modules may interact in many ways with each other.

The user device includes a reading module 408 for reading an information source 420. The reading module may be understood to include a camera and keyboard of a mobile phone, for instance. The read information is conveyed to an address processing module 402. The address processing module 402 may process the information read by the reading module such that a preliminary address is obtained. The processing module may then interact with an intermediate server 430. The address processing module receives a destination address and one or more alternative addresses. A destination address may be conveyed several times when the user device is active using one or more contents servers.

The user device further includes a control unit 404 for controlling different functions in the user device. For instance, the control unit may control actions, which the user executes in the user interface 406, such that they result in the desired action at the user device. The control unit may also control delivery of destination/alternative addresses to a service unit 410. The service unit may be responsible for coordinating the service function that the user desires to execute. The function unit 412 may provide the service unit 410 with needed information, such as time or location of the device.

FIG. 4 shows two intermediate devices 430 and 432. The user device 400 may be in connection with these according to a scheme that is determined by the reading object 420. The reading object may define that the user device should connect to IS-1 when within area AREA-1, whereas when the user device is within AREA-2 distinct from AREA-1, is should request address information from IS-2.

For simplicity, FIG. 4 only shows the functionality of IS-1 in more detail but the functionality of IS-2 may be assumed to be similar.

IS-1 includes a mapping module 432, which maps the preliminary address received from a user device to a destination address. In an embodiment, the mapping means simply reading an IP-address that corresponds to an IP address or a service provider name corresponding to the destination address received from the user device. The mapping procedure may be done by using a database 434 or lookup table in an intermediate server 430. In another embodiment, the received request from the user device may include several other parameters, such as the location of the user device, for instance. The database may include a plurality of records related to a preliminary address provided by the user device, which records may be related to different moments of time or different locations of the user device. The database may also include a hopping sequence, which the user device should use in case of a particular preliminary destination address. FIG. 4 also shows a function module 436, which may provide information, such as time, if needed by the mapping module 432.

FIG. 4 also shows another intermediate server 438. The user device may use either of the intermediate servers depending on the information contained in the reading object 420. The information in the reading object may also be used together with location and/or time information to decide which server the user device should contact for receiving address information of the service provider.

FIG. 4 also shows three content servers 440 to 444. The service unit 410 may branch to one of the servers according to the destination information. The complete service required by the user device may be obtained by using one server, such as CS-1. Alternatively, the user device may fetch a portion of data from each of the content servers 440 to 444. In an embodiment, the user device may continuously toggle between the content servers 440 to 444 according to a hopping sequence provided by one or more intermediate servers 430, 432. There may thus be a predetermined set of content servers, between which the user device shall hop during the use of the service. In an embodiment, the intermediate server feeds the user device continuously or periodically with destination addresses, which the user device should use. Alternatively, the intermediate server provides the user device with a set of destination addresses only once and also provides an instruction how to hop between the destination addresses.

In an embodiment, the user device may retrieve the data from any of the content servers. In this case the user device may prefer to use one of the destination addresses and then use one of the alternative addresses if the preferred destination address is not available for some reason.

The interfaces in FIG. 4 may be radio interfaces or fixed interfaces or a combination of both. For example, if server 430 is an Internet server and the user device is a mobile phone, the interface between them requires the use of both a radio interface and a packet data connection provided by the mobile phone network and the Internet.

The contents server 440 to 444 may be mutually synchronized and/or may be synchronized with one or more intermediate servers. For instance, if the intermediate server provides a hopping sequence for changing content server periodically every second, the content servers may need to be synchronized with the intermediate server. However, even if a hopping sequence is provided, the contents server need not necessarily be synchronized. Furthermore, the user device may be connected to a plurality of content servers simultaneously, which may be the case in a multiradio device, for instance.

In an embodiment, the functionality disclosed above is used for paying a bill. The user of a mobile phone reads a matrix code printed on a paper-form bill. The matrix code includes information of the sender company of the bill, who also receives the money paid by the user. The user device sends the information, which need not necessarily be an IP address but may also be a name of the company in text format, to an intermediate device. The address request or indicator may also indicate that the question is of a bill, and information of the bank in which the user of the user device has a bank account.

On the basis of the request by the user device, the intermediate device notices that the question is of a bill, and provides a bank address as a response to the indicator provided by the user device. The user device receives the address of the bank, that is a destination address. Upon reception of the destination address, the user device may perform some other functionality related to the paying of the bill. For instance, the user device may take a user name and a password from the user as input before connecting to the web-site of the bank. When the user device has received the data from the user, the device may proceed directly to paying of the bill in the bank. The paying may then proceed automatically so far that the user needs only to either accept or refuse the paying of the bill and if the user accepts the bill, the bill is paid from the account of the user.

The embodiments provide several advantages. If the above payment example is considered, the operator of the network has no possibility to charge of the use of the service anything beyond a normal fixed or data amount based charge. That is, currently corresponding services are implemented in a GSM system as an SMS (Short Message Service) service. The operator may in some cases charge a substantial portion of the cost paid by the user. The added value provided by the operator in the service is that billing may be included into a telephone bill.

The embodiments also provide the advantage that data transfer between the user device and the content server is not dependent on the operational status of the intermediate server. For instance, if the intermediate server is not functional due to a failure, the data transfer between a user device and content server may continue normally.

In an embodiment, there is provided a user device comprising a reading module configured to read an indicator, wherein the user device also comprises a transmitting unit configured to transmit the indicator to an intermediate device, a receiving unit configured to receive from the intermediate device one or more destination addresses formed on the basis of the indicator, and a connecting unit configured to connect the user device to one or more destination addresses. The user device may be a mobile phone and the reading module may be a camera of the phone. The indicator may be a 2D matrix code, which includes a preliminary destination address. The preliminary destination address may be a 5-digit number, for instance. The user device sends the indicator to an intermediate device, which may a server connected to the Internet. The server provides one or more destination addresses, which the user device may connect to. The destination addresses may be in the form of Internet http-addresses, for instance.

In an embodiment, there is provided a user device, wherein the connecting unit is configured to connect the user device to one or more destination addresses such that user data transferred between the originating device and a destination device at the destination address bypasses the intermediate device. Thus, the user data may be transmitted directly between the user device and a content server at a destination address.

The destination addresses may change on the basis of the time of the day, the location of the device or the language used in the user device.

In an embodiment, there is provided a user device, wherein the receiving unit is configured to receive new destination addresses several times during a service function carried out by the user device. Thus, during a service used by the user device, the user device may be provided with new and changing destination addresses. The group of destination addresses may also be small, and change periodically. For instance, the user device may toggle between three content servers and change the server each 10 seconds.

In an embodiment, there is provided a user device, comprising a processing unit configured to provide a sub-indicator, wherein the connecting unit is configured to connect the originating device only to a destination address complying with the sub-indicator. The sub-indicator may be either provided in a matrix code or it may be provided by the user device. For example, the sub-indicator may be that the user of the user device is interested in items costing less than 10,000 euros. The matrix code contains as a preliminary address (indicator) a group of cars. When these two pieces of information are combined, the user device may search cars below the price of 10,000 euros. The intermediate device provides such destination addresses. Alternatively, the intermediate device provides a group of destination addresses only with limitation "cars", and the user device adds the price criterion for the communication between the user device and a content server. The user device may then ask a content server if it contains any cars under 10,000 euros, and if it does, it provides the user device with the information.

In an embodiment, there is provided a network element, comprising a coordinating unit configured to coordinate destination devices at respective destination addresses such that each destination device provides a service content at the moment of time indicated by the coordinating unit. This means that the intermediate server provides a sequentially changing group of content servers, between which the user device should toggle. The intermediate device may send to the user device the exact moments when it should contact each content server. The content servers may also be coordinated by the intermediate server such that each of the content servers opens itself for reading only at the time when the user device is about to read said content server. The intermediate device thus coordinates the reading operation of the user device and opening for reading of the content servers so that they are mutually synchronised.

The functionality disclosed in the various embodiments may be implemented by way of a computer program product encoding a computer program of instructions for executing a computer process of the method described above. The computer program product may be implemented on a computer program distribution medium. The computer program distribution medium may be any known software distribution medium, such as a computer readable medium, a program storage medium, a record medium, a computer readable memory, a computer readable software distribution package, a computer readable signal, a computer readable telecommunication signal, or a computer readable compressed software package. Alternatively, part of the functionality may be implemented by hardware, such as ASIC (Application Specific Integrated Circuit) or by a combination of hardware and software.

The embodiments are not, however, restricted to the system given as an example but a person skilled in the art may also apply the solution to other communication systems provided with the necessary properties.

The invention claimed is:

1. A method of controlling a connection, comprising:
reading an indicator in an originating device;
transmitting the indicator to an intermediate server;
connecting the originating device to a content server in the group of content servers such that the content server to be used is changed several times during a service function carried out by the originating device,
wherein the intermediate server has a continuous connection with the originating device and the intermediate server coordinates the connecting of the originating device to the content servers in the group of content servers, and
wherein the originating device is connected to content servers such that user data transferred between the originating device and the content server bypasses the intermediate server when the continuous connection between the intermediate server and the originating device is still maintained and the intermediate server coordinates the connecting of the originating device to the content servers in the group of content servers; and
receiving in the originating device from the intermediate server together with information on the group of content servers a hopping sequence, which indicates to the originating device the sequence and time intervals of hopping between the content servers in the group of content servers,
wherein the originating device and the intermediate server are located in a mobile phone or the originating device is located in a mobile phone and the intermediate server is located in an internet server.

2. A method according to claim 1, wherein
the group of content servers is received in the originating device such that and a new content servers from the group of content servers are received continuously from the intermediate server.

3. A method according to claim 1, wherein
the one or more content servers are determined on the basis of the indicator and the time of the day.

4. A user device, comprising:
a reading module configured to read an indicator;
a transmitting unit configured to transmit the indicator to an intermediate server;
a receiving unit configured to receive from the intermediate server a group of content server addresses determined on the basis of the indicator; and
a connecting unit configured to connect the user device to content servers in the group of content servers which content server is changed several times during a service function carried out by the user device,
wherein the receiving unit is configured to receive together with the group of content servers information on a hopping sequence, which indicates the sequence and time intervals of hopping between the content servers, and
wherein the user device and the intermediate server are located in a mobile phone or the user device is located in a mobile phone and the intermediate server is located in an internet server.

5. A user device according to claim 4, further comprising:
a processing unit configured to determine a hopping sequence for hopping between a plurality of intermediate servers from the indicator read by the reading module.

6. A user device according to claim 4, wherein
the receiving unit is configured to receive, from an intermediate device new content server addresses continuously during a service function carried out by the user device.

7. A user device according to claim 4, wherein
the receiving unit is configured to receive new content server addresses from an intermediate device coordinating the connecting of the user device to the content servers.

8. A user device according to claim 4, wherein the reading module is configured to read a two-dimensional code, the user device further comprising a modification module configured to form the indicator from the read two-dimensional code.

9. A network element, comprising:
a receiving unit configured to receive an indicator from a user device, comprising:
a processing unit configured to form a group of content server addresses on the basis of an indicator, the group of content servers including content servers to be used sequentially by a user device for retrieval of data content; and
a transmitting unit configured to transmit the group of content server addresses to the user device,
wherein the processing unit is configured to provide together with the group of content servers a hopping sequence, which indicates the sequence and time intervals of hopping between the content servers, and
wherein the user device and the network element are located in a mobile phone or the user device is located in a mobile phone and the network element is located in an internet server.

10. A network element according to claim 9, wherein
the processing unit is configured to provide the group of content servers on the basis of one or more characteristics of the user device received together with the indicator.

11. A network element according to claim 9, further comprising:
a coordinating unit configured to coordinate the content servers in the group of content servers such that each content server provides a service content at the moment of time indicated by the coordinating unit.

12. A network element according to claim 9, further comprising:
the transmitting unit is configured to send new content server address several times during a service function carried out by the user device.

13. A network element according to claim 9, wherein the network element is located in a mobile station.

14. A non-transitory computer readable medium storing computer program instructions, wherein execution of the computer program instructions in a data processing system causes the data processing system to perform the steps of:
reading an indicator in an originating device;
transmitting the indicator to an intermediate server;
connecting the originating device to a content server in the group of content servers such that the content server to be used is changed several times during a service function carried out by the originating device,
wherein the intermediate server has a continuous connection with the originating device and the intermediate server coordinates the connecting of the originating device to the content servers in the group of content servers, and
wherein the originating device is connected to content servers such that user data transferred between the originating device and the content server bypasses the intermediate server when the continuous connection between the intermediate server and the originating device is still maintained and the intermediate server coordinates the connecting of the originating device to the content servers in the group of content servers; and
receiving in the originating device from the intermediate server together with the group of content servers a hopping sequence, which indicates to the originating device the sequence and time intervals of hopping between the content servers in the group of content servers,
wherein the originating device and the intermediate server are located in a mobile phone or the originating device is located in a mobile phone and the intermediate server is located in an internet server.

* * * * *